US010095483B2

(12) United States Patent
Ielceanu et al.

(10) Patent No.: US 10,095,483 B2
(45) Date of Patent: *Oct. 9, 2018

(54) MODULARIZED XML NAMESPACES

(71) Applicant: TIBCO Software Inc., Palo Alto, CA (US)

(72) Inventors: Sabin S. Ielceanu, Los Gatos, CA (US); Joseph T. Baysdon, Pittsboro, NC (US); Tim R. Diekmann, San Jose, CA (US)

(73) Assignee: TIBCO Software Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,077

(22) Filed: Dec. 4, 2017

(65) Prior Publication Data
US 2018/0088910 A1   Mar. 29, 2018

Related U.S. Application Data

(63) Continuation of application No. 15/076,296, filed on Mar. 21, 2016, now Pat. No. 9,864,581, which is a continuation of application No. 14/188,371, filed on Feb. 24, 2014, now Pat. No. 9,323,501.

(51) Int. Cl.
*G06F 8/30* (2018.01)
*G06F 8/70* (2018.01)
*G06F 8/36* (2018.01)
*G06F 17/30* (2006.01)

(52) U.S. Cl.
CPC .................. *G06F 8/31* (2013.01); *G06F 8/36* (2013.01); *G06F 8/70* (2013.01); *G06F 17/30893* (2013.01)

(58) Field of Classification Search
CPC ..... G06F 8/31; G06F 8/36; G06F 8/70; G06F 8/71; G06F 17/30893
USPC .................................................. 717/120–123
See application file for complete search history.

(56) References Cited

U.S. PATENT DOCUMENTS

| | | |
|---|---|---|
| 2003/0101434 A1 | 5/2003 | Szyperski |
| 2006/0265508 A1 | 11/2006 | Angel |
| 2007/0101315 A1 | 5/2007 | Dahyabhai |
| 2007/0245294 A1 | 10/2007 | Saito |
| 2007/0294451 A1 | 12/2007 | Dahyabhai |
| 2011/0066626 A1 | 3/2011 | Dharmalingam |
| 2012/0096433 A1 | 4/2012 | Reinhold |

*Primary Examiner* — Qing Chen
(74) *Attorney, Agent, or Firm* — McGuireWoods LLP

(57) ABSTRACT

Techniques to provide and use modularized XML namespaces are disclosed. In various embodiments, a resolution request associated with a first module is received. A resolution context associated with the first module is used to determine that a component made available by a second module is associated with the resolution request. Access to a shared instance of the component made available by the second module is provided.

20 Claims, 11 Drawing Sheets

MODULARIZED XML NAMESPACES

CROSS REFERENCE TO OTHER APPLICATIONS

This application is a continuation of U.S. patent application Ser. No. 15/076,296, entitled MODULARIZED XML NAMESPACES filed Mar. 21, 2016, now U.S. Pat. No. 9,864,581, which is incorporated herein by reference for all purposes, which is a continuation of U.S. patent application Ser. No. 14/188,371, entitled MODULARIZED XML NAMESPACES filed Feb. 24, 2014, now U.S. Pat. No. 9,323,501, which is incorporated herein by reference for all purposes.

BACKGROUND OF THE INVENTION

XML processing is a task that is commonly performed by enterprise application servers. For example, an application development model that depends on XML processing may be defined. Typically, however, the XML documents (XML schema documents, WSDL documents, etc.) required by an application must be included as part of the application that requires them. In other words, they must be physically packaged as part of the application. In some cases, the same XML document may be required to be included in the respective packages of multiple modules of an application, to ensure each module will have access to the XML documents it may require at runtime.

BRIEF DESCRIPTION OF THE DRAWINGS

Various embodiments of the invention are disclosed in the following detailed description and the accompanying drawings.

DETAILED DESCRIPTION

Figure 1:
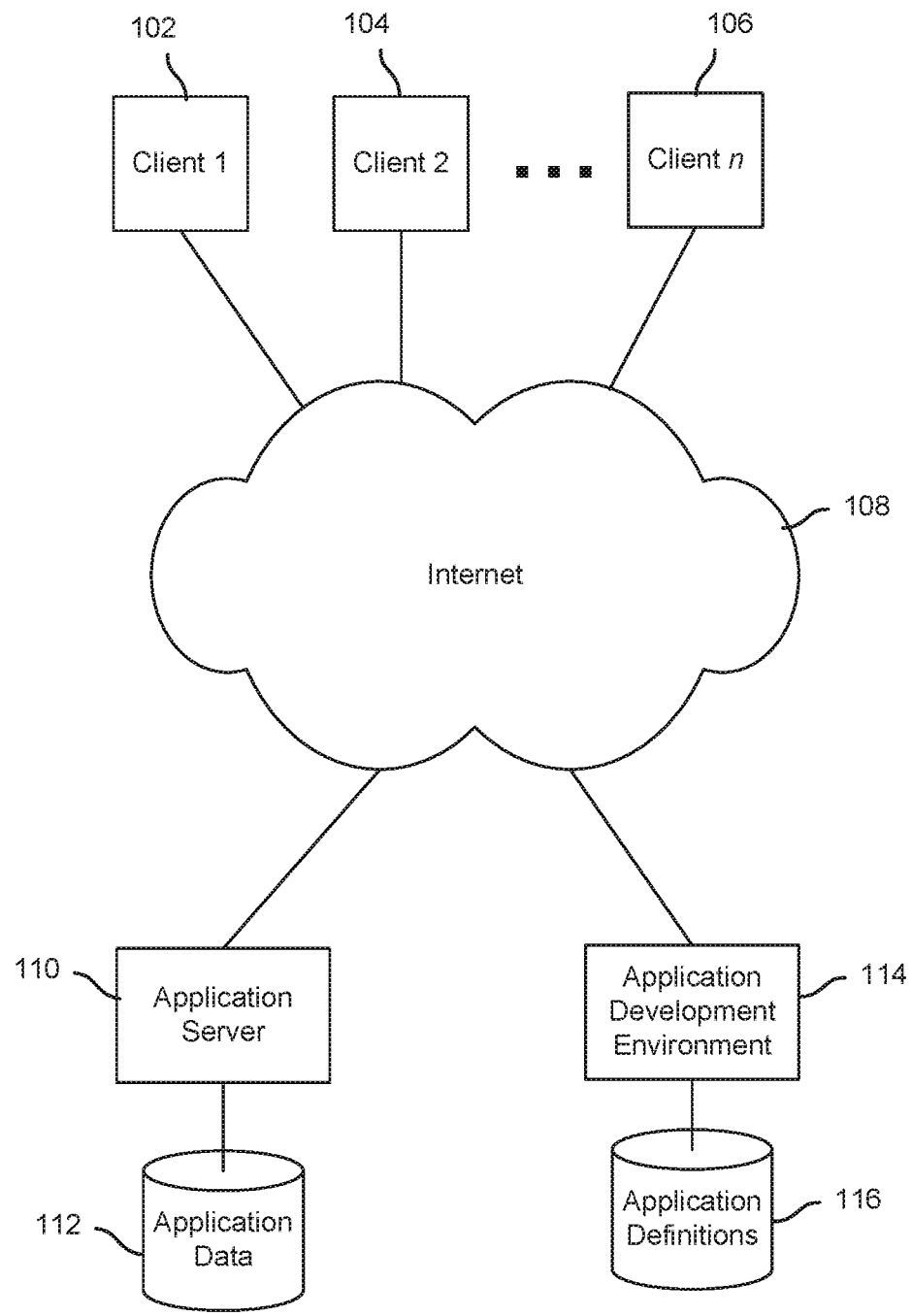
FIG. 1 is a block diagram illustrating an embodiment of an application server and associated environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Sharing target namespace-based XML, documents (e.g., XML schema documents, WSDL documents, etc.) across application modules (or other system components) is disclosed. In various embodiments, a module has metadata that indicates which, if any, XML namespaces the module makes available to other modules and which, if any, other modules on which the module depends, i.e., which other modules are required to be available in order for the module to be consistent in terms of required XML components being available to the module. In various embodiments, a module's metadata may include one or more of the following:

Exported Namespaces—A list with all the namespaces that are made available to other modules (i.e. "public namespaces"). All public namespaces that are part of the module are available to be used by other modules.

Dependent Modules—A list with all the modules that are required to be available in order for the module to be consistent. All public namespaces that are part of these dependent modules are available to be used by the module. In some embodiments, each dependent module dependency can specify a version range identifying a range of versions of the dependent module, any one of which versions may be used to satisfy the dependency.

Dependent Namespaces—A list with all the namespaces that are required by the module in order to be consistent. In some embodiments, a module can declare dependencies on individual namespaces when the modules they belong to are not known at the time the metadata is produced.

FIG. 1 is a block diagram illustrating an embodiment of an application server and associated environment. In the example shown, a plurality of clients represented in FIG. 1 by client systems 102, 104, and 106 have access via a network, such as the Internet 108, to an application server 110 configured to store application data in an application data store 112. One or more application developers may in various embodiments use an application development environment 114, e.g., an application development tool, to define an application. Application definitions may be stored in an application definition store 116. In some embodiments, a tool may be provided, e.g., via application development environment 114, to enable a developer to define an application and associated functionality, processes, resources, etc., in a declarative, visual, and/or other manner. An application development platform comprising or otherwise associated with the application development environment 114 may generate programmatically application code to provide and deploy to application server 110 an application based on the definition provided by the developer(s). In a modular application environment, each of one or more modules comprising an application may be defined at least in part by one or more different developers. Sharing of XML resources across modules may be complicated in some cases by the fact that different developers may be involved in the development in different modules. In some embodiments, an effort is made to coordinate among developers to ensure that at least among application modules that share XML resources, XML namespace collisions, i.e., the use of the same qualified name to refer to different components, are avoided.

Figure 2:
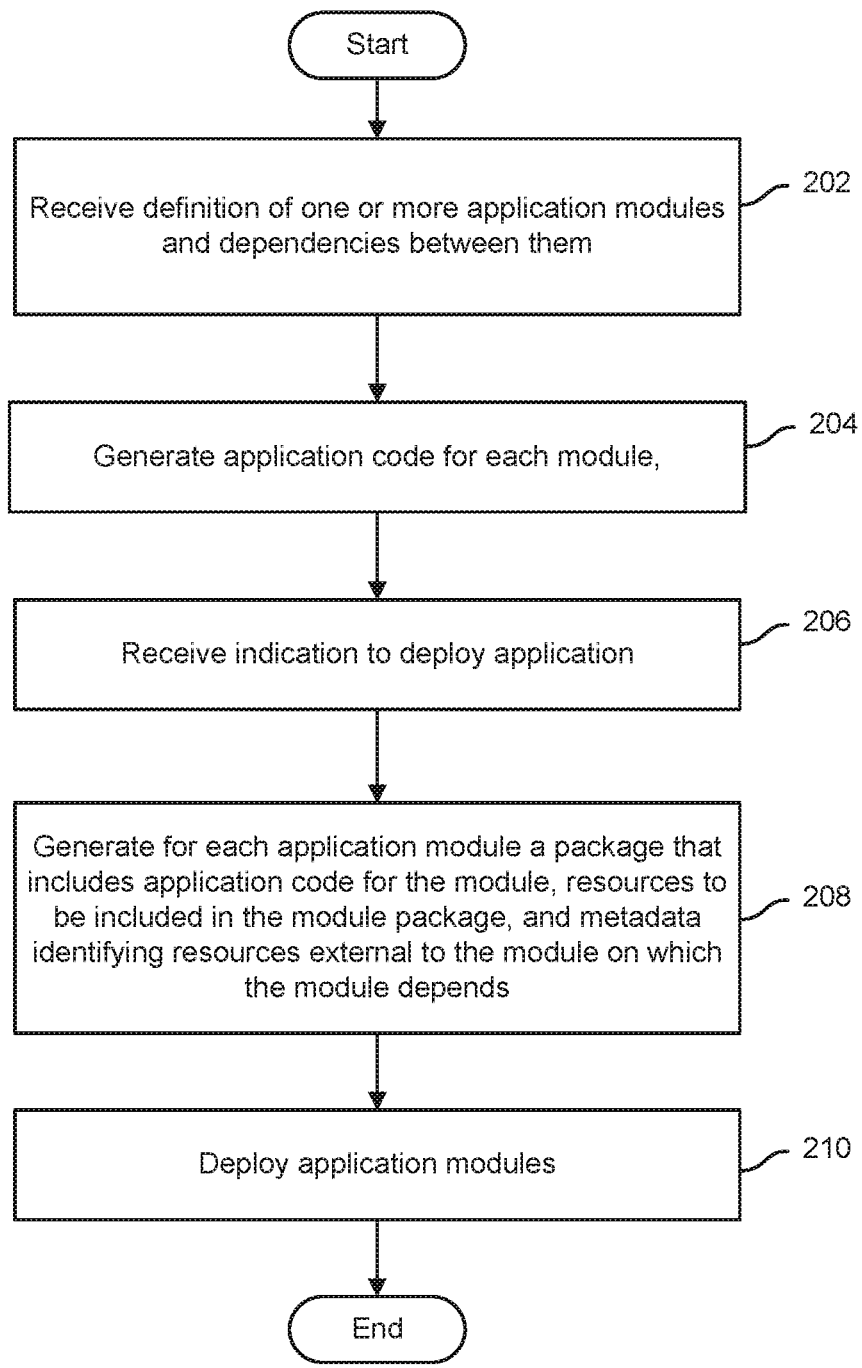
FIG. 2 is a flow chart illustrating an embodiment of a process to develop and deploy an application.

FIG. 2 is a flow chart illustrating an embodiment of a process to develop and deploy an application. In various embodiments, the process of FIG. 2 is used to provide and deploy an application comprising modules that share XML resources. In the example shown, a definition of one or more application modules, and for each an identification of which other module(s) on which the current module depends, is received (202). A module on which a referencing module depends for consistency is sometimes referred to herein as a "dependent module". Once application module definitions have been received (202), for each module application code to provide the module as defined is generated programmatically (204). An indication to deploy the application (and/or module) is received (206). For each module to be deployed, or for all if the entire application is to be deployed, a package is created (208). Each module, the package includes the application code that has been generated for that module; resources to be packaged with the module, e.g., XML documents used by the module and/or provided by the module for use by other modules; and metadata indicating which (if any) XML resources of the module are to be made "public", i.e., available for use by other modules, and an identification of which other modules are required by the module to be available for the module to be consistent (e.g., which modules are "dependent modules" of the module with which the package is associated). Once packaged, the application and component modules are deployed (210). For example, the application and component module packages may be sent to an application server such as application server 110 of FIG. 1. The application server in various embodiments may be configured to process the package(s) to enable the application to be run on the application server, including by providing sharing of XML resources across modules are disclosed herein.

Figure 3:
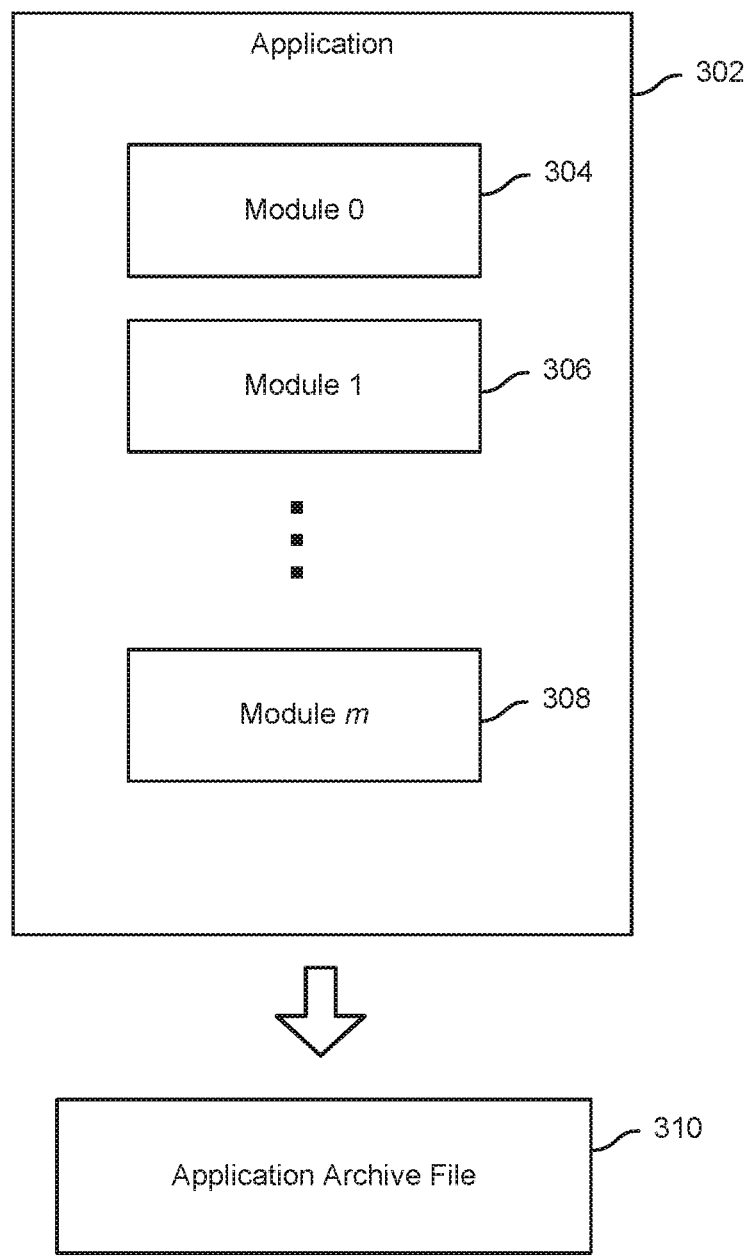
FIG. 3 is a block diagram illustrating an embodiment of a system to deploy an application.

FIG. 3 is a block diagram illustrating an embodiment of a system to deploy an application. In the example shown, an application 302 includes a plurality of modules represented in FIG. 3 by modules 304, 306, and 308. Each of the modules 304, 306, and 308 can include application code for the module, XML and other resources packaged with the module, and metadata indicating which XML, namespaces of the module are to be made available for use by other modules and metadata indicating which XML namespaces the module requires to be available in the system and an identification of which other modules on which the referencing module depends. The application 302 and component modules 304, 306, and 308 are packaged in this example in a single application archive file 310, such as a Java enterprise archive (.ear) file. In various embodiments, the application archive file 310 may be sent to a remote application server, which in turn uses the application archive file 310 to deploy and run the application.

In various embodiments, the modules (e.g., 304, 306, 308) of application 302 and the relationships between them may be expressed at least in part in a manner defined by applicable OSGi specifications. In some embodiments, an XML namespace resource requirement/capability of a module may be expressed using extensions defined generically in the OSGi specifications. For example, each may indicate the XML namespaces required and/or made available to other modules by the module in a manner defined generically in the OSGi specifications to identify resources required and/or provided by the module. In some embodiments, an OSGi or similar framework may be used to resolve XML namespace or other XML dependencies expressed in a manner defined generically in the OSGi specifications.

Figure 4A:
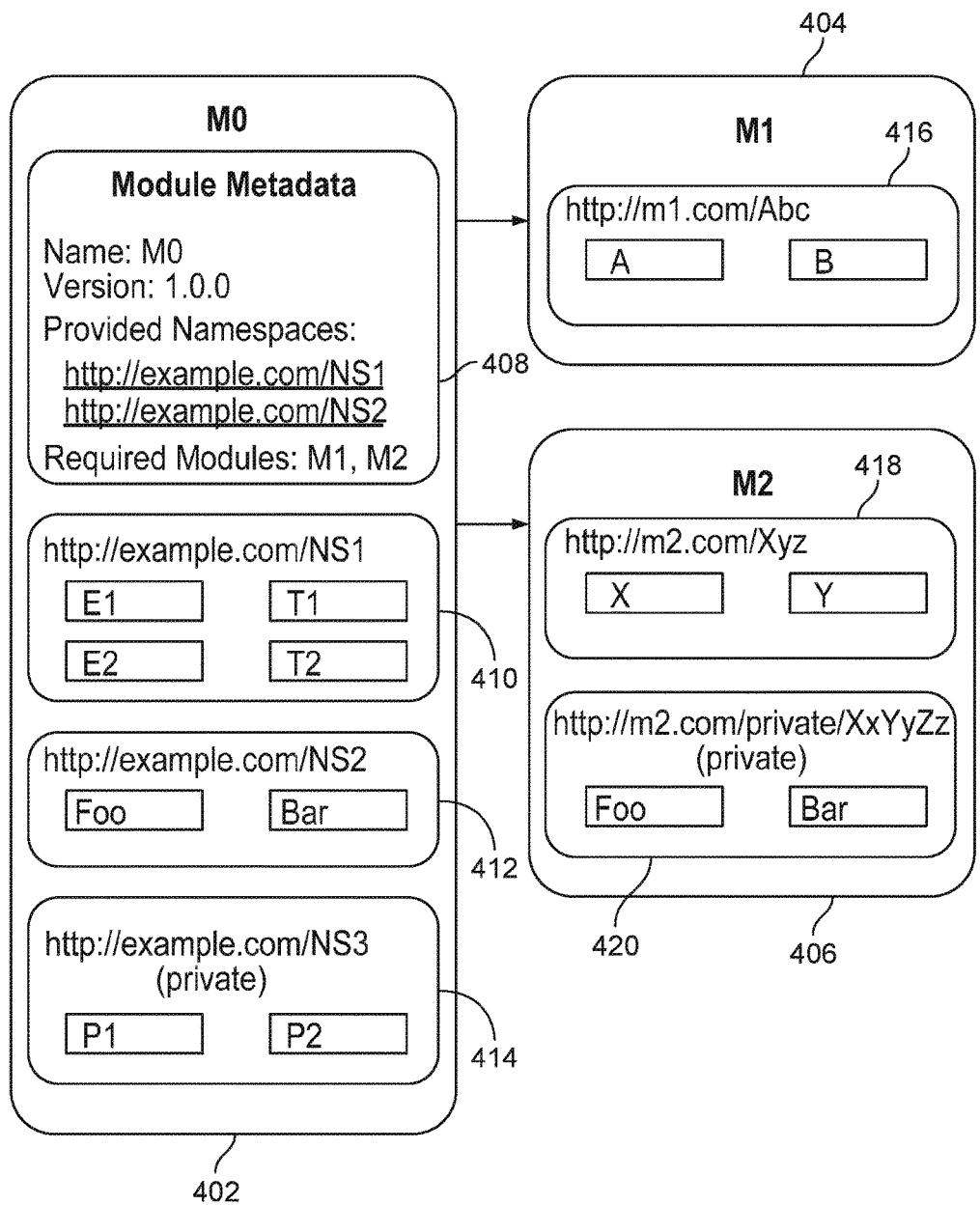
FIG. 4A is a block diagram illustrating an embodiment of an application module that depends on one or more other modules.

FIG. 4A is a block diagram illustrating an embodiment of an application module that depends on one or more other modules. In the example shown, a first module 402 depends on two other modules 404 and 406. The dependency is identified in module metadata 408 of module 402. The metadata 408 in addition provides a name and version number of the module, and lists the XML namespaces associated with XML resources of the module which are to be made available for use by other modules. In this example, a first XML document 410 associated with a first XML namespace (i.e., http://example.com/NS1) and a second XML document 412 associated with a second XML namespace (i.e., http://example.com/NS2) are listed as namespaces provided to other modules. In this example, a third XML document 414 included in the module 402 is not listed in the metadata 408 as a namespace provided to other modules. Instead, the document 414 and associated namespace are kept "private", i.e., reserved for use only by the module 402. In the example shown, the module 404 includes an XML document 416 that is "public", i.e., made available for use by other modules, while the module 406 includes one public XML document and namespace 418 and one that is private 420.

Figure 4B:
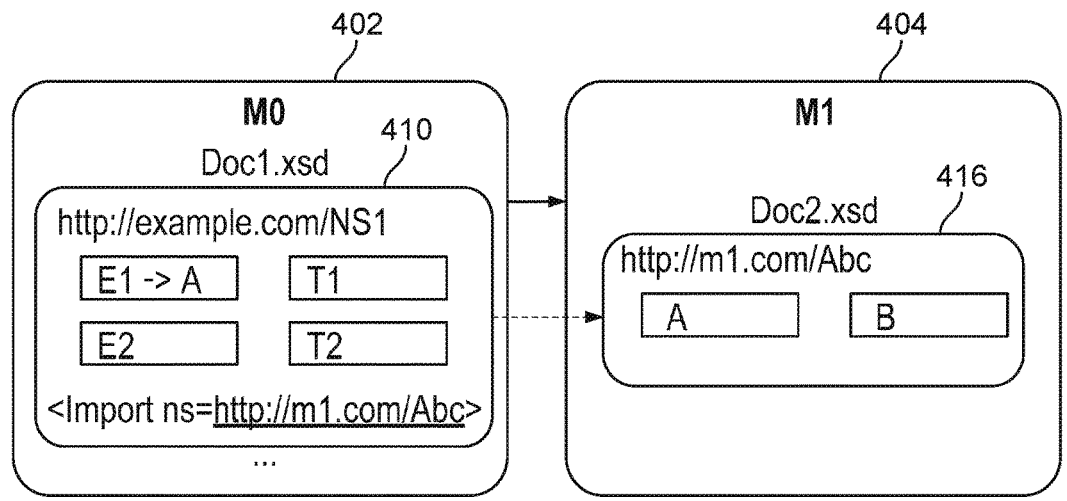
FIG. 4B is a block diagram illustrating an example of an application module and associated document that depends on an XML namespace associated with another module.

FIG. 4B is a block diagram illustrating an example of an application module and associated document that depends on an XML namespace associated with another module. In the example shown, one can see that a component "E1" of XML document 410 of module 402 requires a component "A" that is included in XML document 416 of module 404. The <import> syntax is shown as being used in document 410 to express the reference to the target namespace in which in this example the component "A" may be found. For example, a qualified name of the component "A" within the imported namespace http://m1.com/Abc may be used in referencing document 410 to identify the required component "A".

Figure 4C:
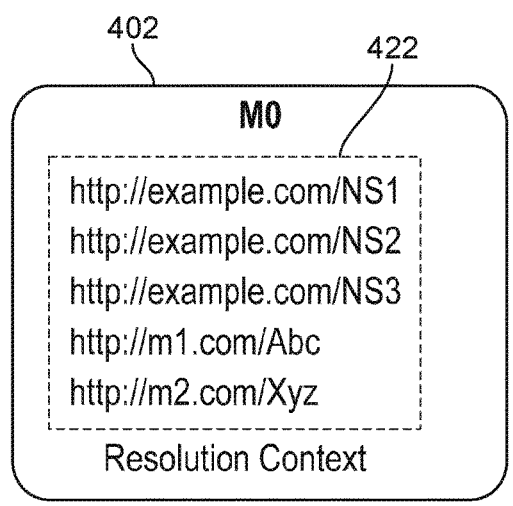
FIG. 4C is a block diagram illustrating an embodiment of an XML namespace resolution context specific to an application module.
Figure 4D:
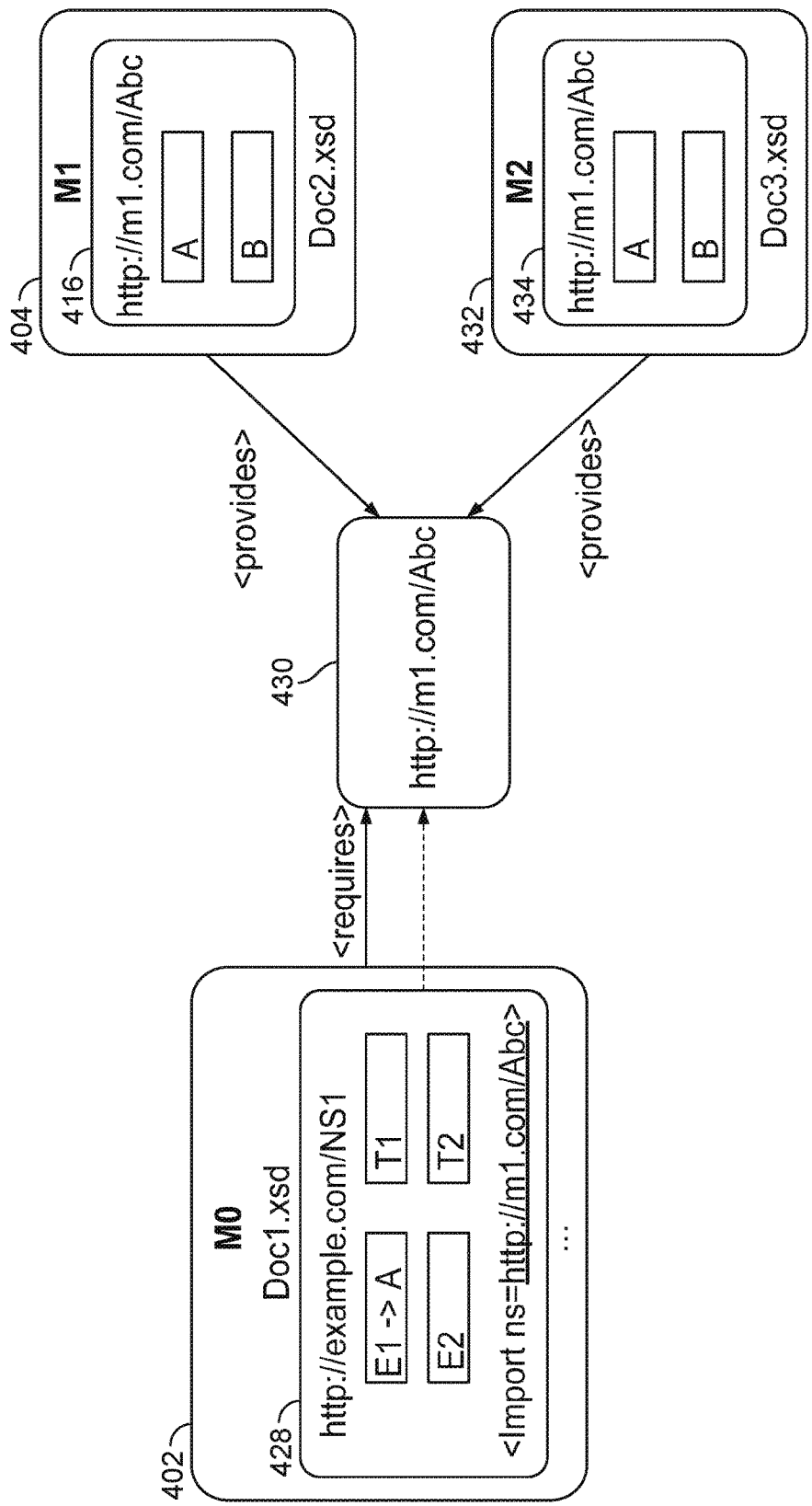
FIG. 4D is a diagram illustrating an example of an application module 402 and its associated XML document 428 that depends on an XML namespace 430.

FIG. 4D is a diagram illustrating an example of an application module 402 and its associated XML document 428 that depends on an XML namespace 430. In the example shown, there are two different modules, module 404 and module 432, that export the namespace 430 required by module 402. One can see that a component "E1" of XML document 428 of module 402 requires a component "A" that is included in XML document 416 of module M1 (404) as well as in the XML document 434 of module M2 (432). The <import> syntax is shown as being used in document 428 to express the reference to the target namespace 430 in which in this example the component "A" may be found. Since there are two different documents (416, 434) in two different modules (404, 432) that are exporting the same namespace 430, the resolution is not deterministic. In various embodiments, the resolver who is the component that encapsulates the resolution logic, such as XML resolution logic 510 of FIG. 5 (described below), makes a selection of the actual XML document used to provide a required component that is available from more than one module and/or document. This selection may be based on, but is not limited to, constraints that are defined as part of the module metadata.

In various embodiments, access to an XML component shared by another application module (or other system component) is provided. In various embodiments, for each module (or other component) a resolution context to be used to resolve references by that module or associated elements to required components, e.g., a qualified name of an XML component, is created.

FIG. 4C is a block diagram illustrating an embodiment of an XML namespace resolution context specific to an application module. In the example shown, a resolution context 422 of the module 402 is shown to include the respective namespaces associated with the (public and private) XML documents that were packaged with the module 402 as well as the namespaces made available to the module 402 by the modules 404 and 406, respectively, on which module 402 includes it depends. In various embodiments, the resolution logic of an application server on which an application of which module 402 is a component is running would use the resolution context 422 of module 402, at application runtime, to resolve references made by module 402 or associated elements (e.g., XML document 410 in the example shown).

In various embodiments, in order for the resolution logic to be deterministic, the system defines and implements rules for how relationships are captured across XML documents that are either defined as part of the same module or defined as part of different modules.

For example, when only one definition (i.e. XML component) of the referenced qualified name ("QName") exists in the resolution context of a module, the XML document that requires it defines a logical dependency to the component's namespace. When more than one definition of the referenced QName exists in a module, the XML document that requires it, which is part of the same module, defines a physical dependency to the component's namespace.

In some embodiments, physical dependencies can only be established between XML documents that are co-located as part of the same module. This means that an XML document "Doc1.xsd" in module "M0" that requires access to an XML component that is provided by an XML document "Doc2.xsd" that lives in module "M1" (as in the example shown in FIG. 4B) must declare a logical dependency on the Doc2's target namespace. In various embodiments, the resolution logic implemented by the runtime system comprising an application server, for example, has access to the document "Doc2.xsd", since its namespace is available in the module M0's resolution context.

Figure 5:
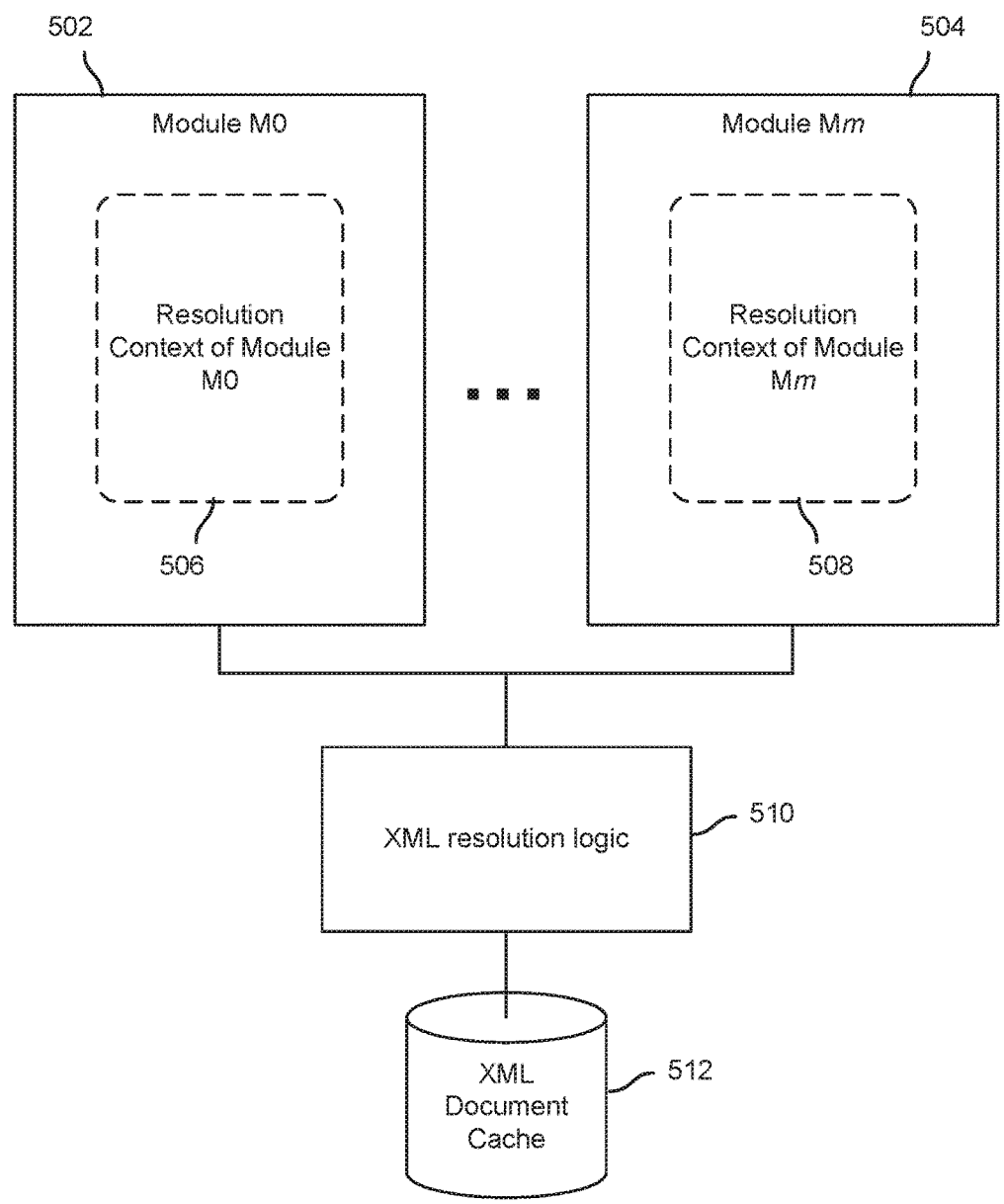
FIG. 5 is a block diagram illustrating an embodiment of a system to share XML documents among application modules.

FIG. 5 is a block diagram illustrating an embodiment of a system to share XML documents among application modules. In the example shown, each of a plurality of modules represented in FIG. 5 by modules 502 and 504 has associated therewith a module-specific resolution context, represented in FIG. 5 by resolution contexts 506 and 508, respectively. An XML resolution logic 510, e.g., comprising an application runtime environment, in various embodiments resolves XML qualified names by using a resolution context of the referencing module to locate and access a shared instance of the referenced XML components as stored in an XML document cache 512 that is shared across modules.

Figure 6:
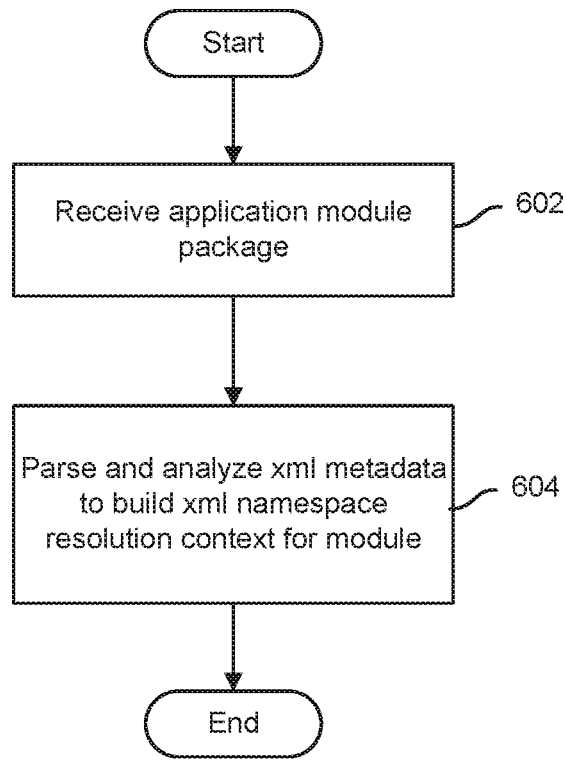
FIG. 6 is a flow chart illustrating an embodiment of a process system to share XML documents among application modules.

FIG. 6 is a flow chart illustrating an embodiment of a process system to share XML documents among application modules. In various embodiments, the process of FIG. 6 may be implemented by an application server, such as application server 110 of FIG. 1. In the example shown, an application module package is received (602). The module package is parsed to extract the module's metadata, which is used to construct an XML namespace resolution context for the module (604). In various embodiments, the resolution context may be stored in a data structure that is associated with the module and is accessible to the resolution logic of a runtime in which an application with which the module is associated is run.

Figure 7:
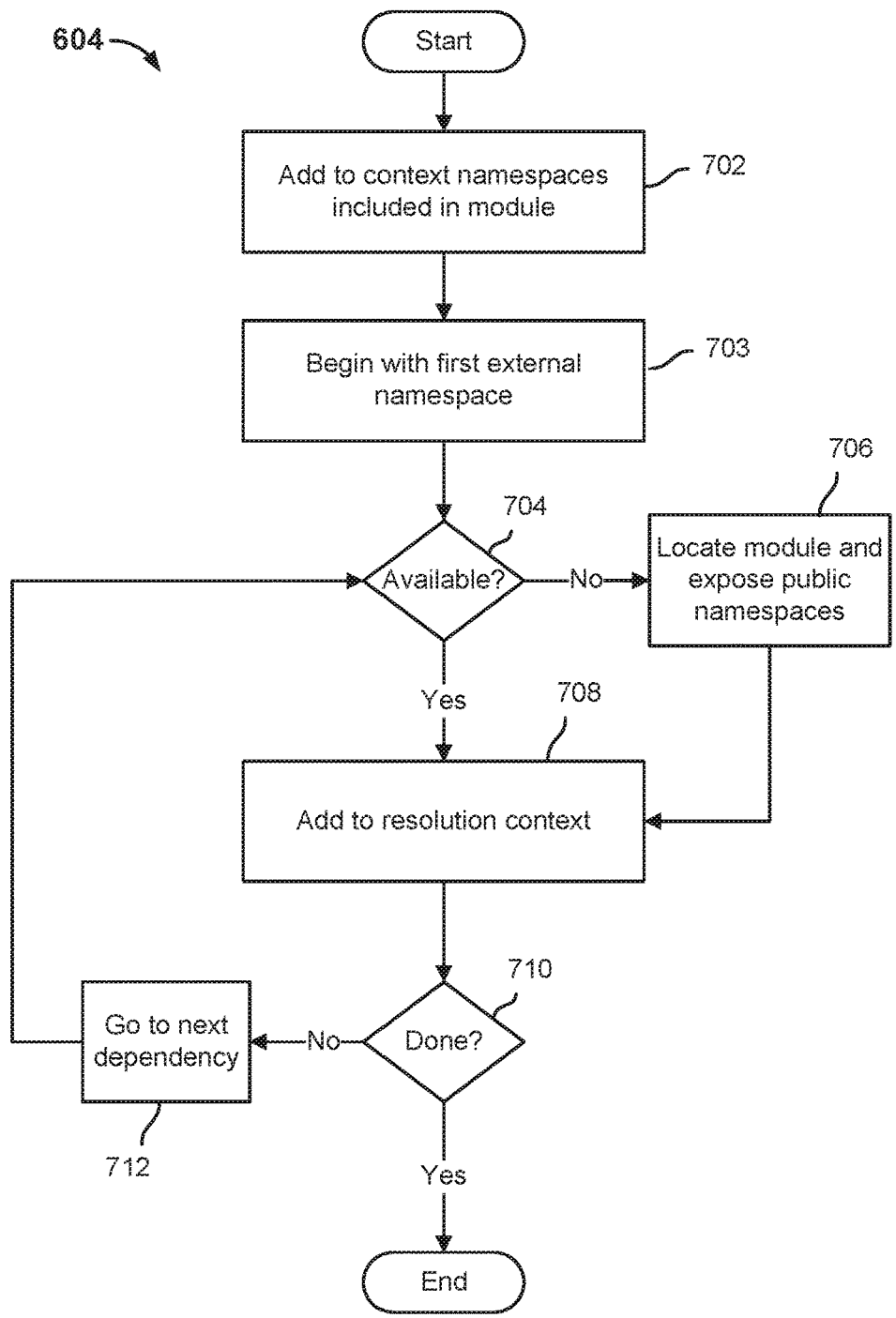
FIG. 7 is a flow chart illustrating an embodiment of a process building an XML namespace resolution context for an application module.

FIG. 7 is a flow chart illustrating an embodiment of a process building an XML namespace resolution context for an application module. In various embodiments, the process of FIG. 7 is used to implement step 604 of FIG. 6. In the example shown, XML namespaces associated with XML resources included in or with the module are added to the module's resolution context (702). Processing of required external components begins with a first external component (703). In various embodiments, the inclusion of the external namespaces/components (703) is performed prior to the inclusion of the namespaces/components that are part of the module (702). It is determined whether the required component is available (704). In some embodiments, the respective previously-cached XML documents made available by one or more dependent modules of the current module are checked. If the referenced namespace/component is determined not yet to be available, the dependent module(s) of the current module are located and the XML namespaces and associated documents made available by such modules for use by other modules are located and added to a shared XML document cache (706). Once the referenced external component is determined to be available (704, 706), the associated namespace and a target XML document with which it is associated (at least for purposes of this referencing module) are added to the referencing module's resolution context (708). If there are other external XML components/documents required by the module (710), processing continues (712) until the module's resolution context includes all internal and external (imported) namespaces.

Figure 8:
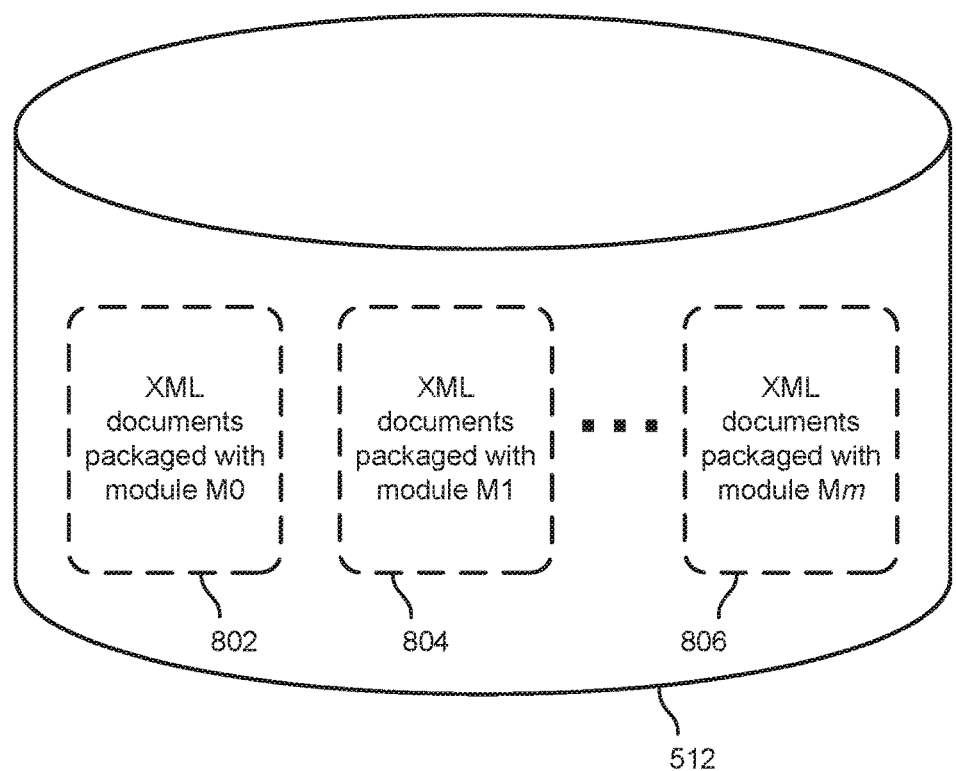
FIG. 8 is a block diagram illustrating an embodiment of an XML document cache.

FIG. 8 is a block diagram illustrating an embodiment of an XML document cache. In the example shown, the XML documents packaged with each module are cached in a manner that associates the document instance with the module in which the document was packaged. In some embodiments, the XML cache is not centralized but rather distributed across modules. Each individual module cache stores the XML documents that are defined as part of the module. In those embodiments, the XML cache is represented by a network of module caches. In the example shown, XML documents associated with modules M0 to Mm have been cached, as represented in FIG. 8 by cached documents 802, 804, and 808.

In various embodiments, two or more modules that depend on the same module (i.e. same version of the module) share at run-time, the same underlying XML components defined as part of the that module. After parsing them, the runtime system caches the XML documents in the context of the module that defines them, e.g., as shown in FIG. 8. By doing that, the runtime system ensures that it minimizes the number of times it parses and loads into memory the XML documents that are part of a particular version of a module, irrespective of the number of modules that are dependent on it.

In various embodiments, a module may indicate a range of versions of a dependent module. Any version of the dependent module that falls within the range may be used by the referencing module. However, other (e.g., newer or older) modules may require a version of the same dependent module which is not in the range specified for one or more other modules that depend on the same dependent modules, but require different versions thereof. In some embodiments, modules may be updated individually, i.e., without updating one or more other modules comprising the same application. To ensure consistency across all modules, in some embodiments, more than one version of a module, and/or XML documents associated with more than one version of a module, may be maintained.

Figure 9:
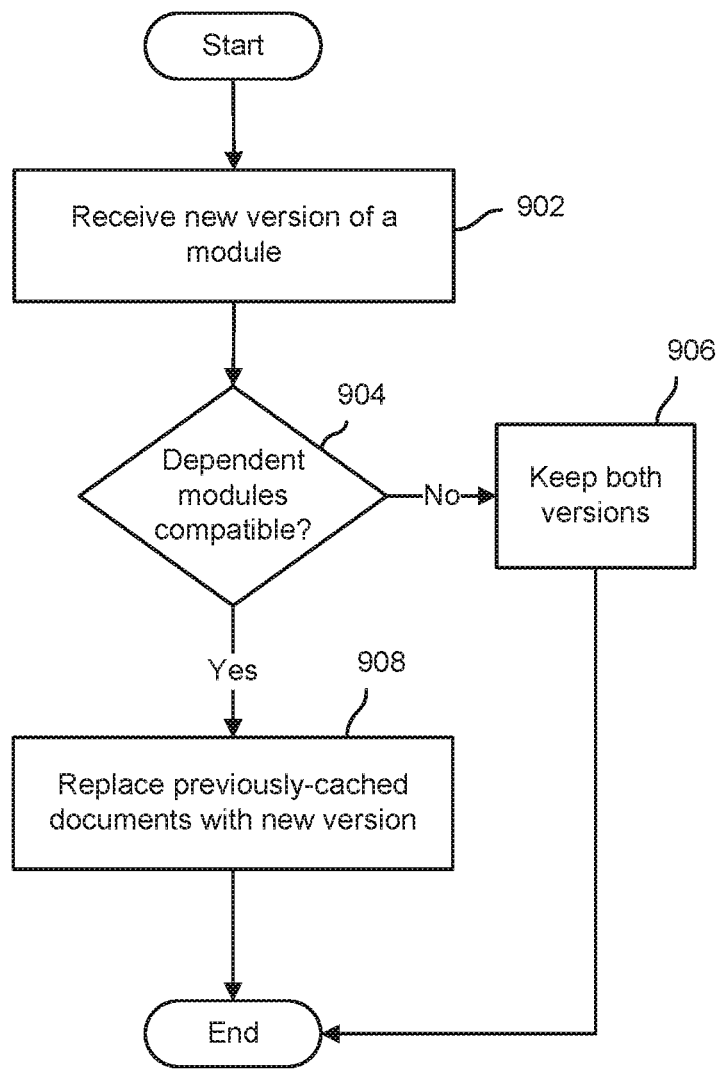
FIG. 9 is a flow chart illustrating an embodiment of a process to update an application server with a new version of an application module.

FIG. 9 is a flow chart illustrating an embodiment of a process to update an application server with a new version of an application module. In the example shown, a new version of an application module is received (902). It is determined whether any/all other modules that depend on the module the new version of which has been received are compatible with the new version (904). For example, if the new version falls outside the range of versions that a module that depends on the module the new version of which has been received, it is determined that not all modules are compatible with the new version (904). If one or more other modules require an earlier version of the module (904), both the existing version(s) and the new version are retained (906). If, instead, any/all modules that depend on the module the new version of which has been received are compatible with the new version (904), the new version can be used to replace the old version and associated resources, e.g., previously cached XML documents (908). In some embodiments, after the new version of the module is received, a module that is using the old version of the module may continue using the old version even if the new version falls in the range of compatible versions. In some embodiments, the association of cache XML documents with the modules that provided them may include an indication of which version of the source module each document is associated with. At runtime, the version information may be used to ensure that for each referencing module a correct version of the XML document associated with the imported namespace is used.

Using techniques described herein, a module that provides a set of namespaces can be swapped with another module that provides the same set of namespaces without changing the underlying XML documents that are dependent on the namespaces provided by the original module. In addition, efficient storage and sharing of XML components across modules can be provided.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
   receiving, by one or more processors, a resolution request associated with a first module, wherein the first module has corresponding metadata that includes an indication of a dependent namespace;
   constructing, by the one or more processors, a resolution context associated with the first module based at least in part on one or more respective namespaces associated with components packaged with the first module;
   determining, by the one or more processors, that both a second module and a third module export the dependent namespace;
   selecting, by the one or more processors, from among the second module and the third module a selected module to provide the dependent namespace;
   determining, by the one or more processors, that a component made available by the selected module is associated with the resolution request;
   wherein the selected module has corresponding metadata that includes an indication of an exported namespace associated with the selected module, and wherein the exported namespace associated with the selected module is included in the resolution context associated with the first module; and
   providing, by the one or more processors, access to a shared instance of the component made available by the selected module.

2. The method of claim 1, wherein the selected module is selected based at least in part on a constraint defined in the first module.

3. The method of claim 2, wherein the constraint is defined as part of the corresponding metadata of the first module.

4. The method of claim 1, wherein the selected module is selected based at least in part on a rule for how relationships are captured across XML documents.

5. The method of claim 1, wherein the first module defines a physical dependency to the dependent namespace.

6. The method of claim 1, wherein the first module declares a logical dependency on the selected module.

7. The method of claim 1, wherein the corresponding metadata of the first module is used to construct the resolution context associated with the first module.

8. A computer system, comprising:
   a memory; and
   one or more processors coupled to the memory and configured to:
      receive a resolution request associated with a first module, wherein the first module has corresponding metadata that includes an indication of a dependent namespace;
      construct a resolution context associated with the first module based at least in part on one or more respective namespaces associated with components packaged with the first module;
      determine that both a second module and a third module export the dependent namespace;
      select from among the second module and the third module a selected module to provide the dependent namespace;
      determine that a component made available by the selected module is associated with the resolution request;

wherein the selected module has corresponding metadata that includes an indication of an exported namespace associated with the selected module, and wherein the exported namespace associated with the selected module is included in the resolution context associated with the first module; and provide access to a shared instance of the component made available by the selected module as stored in the memory.

9. The computer system of claim 8, wherein the selected module is selected based at least in part on a constraint defined in the first module.

10. The computer system of claim 9, wherein the constraint is defined as part of the corresponding metadata of the first module.

11. The computer system of claim 8, wherein the selected module is selected based at least in part on a rule for how relationships are captured across XML documents.

12. The computer system of claim 8, wherein the first module defines a physical dependency to the dependent namespace.

13. The computer system of claim 8, wherein the first module declares a logical dependency on the selected module.

14. The computer system of claim 8, wherein the corresponding metadata of the first module is used to construct the resolution context associated with the first module.

15. A computer program product embodied in a tangible, non-transitory computer readable storage medium and storing computer instructions configured to:

receive a resolution request associated with a first module, wherein the first module has corresponding metadata that includes an indication of a dependent namespace;

construct a resolution context associated with the first module based at least in part on one or more respective namespaces associated with components packaged with the first module;

determine that both a second module and a third module export the dependent namespace;

select from among the second module and the third module a selected module to provide the dependent namespace;

determine that a component made available by the selected module is associated with the resolution request;

wherein the selected module has corresponding metadata that includes an indication of an exported namespace associated with the selected module, and wherein the exported namespace associated with the selected module is included in the resolution context associated with the first module; and provide access to a shared instance of the component made available by the selected module.

16. The computer program product of claim 15, wherein the selected module is selected based at least in part on a constraint defined in the first module.

17. The computer program product of claim 16, wherein the constraint is defined as part of the corresponding metadata of the first module.

18. The computer program product of claim 15, wherein the selected module is selected based at least in part on a rule for how relationships are captured across XML documents.

19. The computer program product of claim 15, wherein the first module defines a physical dependency to the dependent namespace.

20. The computer program product of claim 15, wherein the first module declares a logical dependency on the selected module.

* * * * *